United States Patent
Blakeley et al.

(10) Patent No.: US 8,713,522 B2
(45) Date of Patent: Apr. 29, 2014

(54) VALIDATING THE CONFIGURATION OF DISTRIBUTED SYSTEMS

(75) Inventors: José A. Blakeley, Redmond, WA (US); Namyong Lee, Tustin, CA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 13/101,690

(22) Filed: May 5, 2011

(65) Prior Publication Data

US 2012/0284690 A1    Nov. 8, 2012

(51) Int. Cl.
  *G06F 9/45*    (2006.01)
  *G06F 9/44*    (2006.01)

(52) U.S. Cl.
  USPC ........... 717/120; 717/121; 717/171; 717/172; 717/176; 717/177

(58) Field of Classification Search
  None
  See application file for complete search history.

(56) References Cited

U.S. PATENT DOCUMENTS

| | | | |
|---|---|---|---|
| 7,792,886 B2 | 9/2010 | Hadari | |
| 2008/0189409 A1 | 8/2008 | Pitkow | |
| 2009/0077005 A1 | 3/2009 | Yung | |
| 2011/0040860 A1 * | 2/2011 | DeCusatis et al. | 709/223 |

OTHER PUBLICATIONS

Johnson, Rich, "Getting Started with Parallel Data Warehouse", May 11, 2010, 3 pages.
Microsoft, "Microsoft SQL Server Project Code-Named Madison", Based on information and belief available, at least as early as Dec. 14, 2010, 2 pages.
Bateman, Cody, "Where are the Articles on Data Warehouse Testing and Validation Strategy?", Oct. 2002, 3 pages.
oracle.com, "Deploy Linux Faster: Oracle Validated Configurations", Based on information and belief available, at least as early as Dec. 14, 2010, 1 page.
gantthead.com, "Data Warehouse Process", Based on information and belief available, at least as early as Dec. 14, 2010, 5 pages.

* cited by examiner

*Primary Examiner* — Qamrun Nahar
(74) *Attorney, Agent, or Firm* — Nicholas Chen; David Andrews; Micky Minhas

(57) ABSTRACT

The present invention extends to methods, systems, and computer program products for validations the configuration of distributed systems. Validation can include a collection of utilities that are systematically deployed across the nodes of an appliance. The utilities execute specified tasks, that when completed, validate the proper functioning state of hardware and/or software components of the appliance. The utilities generate logs, which can be aggregated to present a global view of the appliance.

20 Claims, 13 Drawing Sheets

MemspdResult - Notepad

File  Edit  Format  View  Help

Run Number : 0011

| Date_Time | | Status | Node Name | CPU model | | Cores | Ram (GB) | Read Speed (MB/Sec) | Write Speed (MB/Sec) | Copy Speed (MB/Sec) |
|---|---|---|---|---|---|---|---|---|---|---|
| 03/30/2011 | 17:44:45 | PASSED | EMRA1-BU01 | Intel(R) Xeon(R) CPU | E5520 @ 2.27GHz | 16 | 36 | 14190.3 | 24057.2 | 13444.7 |
| 03/30/2011 | 17:44:11 | PASSED | EMRA1-CMP01 | Intel(R) Xeon(R) CPU | X5550 @ 2.67GHz | 16 | 96 | 16062.4 | 28091.9 | 16423.2 |
| 03/30/2011 | 17:44:11 | PASSED | EMRA1-CMP02 | Intel(R) Xeon(R) CPU | X5550 @ 2.67GHz | 16 | 96 | 16267.0 | 28238.2 | 16423.4 |
| 03/30/2011 | 17:44:12 | PASSED | EMRA1-CMP03 | Intel(R) Xeon(R) CPU | X5550 @ 2.67GHz | 16 | 96 | 15704.6 | 28216.8 | 16607.4 |
| 03/30/2011 | 17:44:13 | PASSED | EMRA1-CMP04 | Intel(R) Xeon(R) CPU | X5550 @ 2.67GHz | 16 | 96 | 16823.7 | 28692.8 | 16241.2 |
| 03/30/2011 | 17:44:14 | PASSED | EMRA1-CMP05 | Intel(R) Xeon(R) CPU | X5550 @ 2.67GHz | 16 | 96 | 15855.7 | 28280.3 | 16540.0 |
| 03/30/2011 | 17:44:14 | PASSED | EMRA1-CMP06 | Intel(R) Xeon(R) CPU | X5550 @ 2.67GHz | 16 | 96 | 16227.4 | 29071.8 | 16656.5 |
| 03/30/2011 | 17:44:15 | PASSED | EMRA1-CMP07 | Intel(R) Xeon(R) CPU | X5550 @ 2.67GHz | 16 | 96 | 16255.7 | 28755.9 | 16677.1 |
| ... | | ... | ... | ... | | ... | ... | ... | ... | ... |

*Figure 4A*

PingResult - Notepad

File  Edit  Format  View  Help

Run Number : 0011
Ping | Number of Packets : 2

| Date | Interface | Source Node | Destination Node | Source IP | Destination IP | Connectivity |
|---|---|---|---|---|---|---|
| 03/30/2011 17:44:14 | Ethernet | EMRA1-BU01 | EMRA1-MAD01 | 172.16.0.220 | 172.16.0.250 | Yes |
| 03/30/2011 17:44:15 | Ethernet | EMRA1-BU01 | EMRA1-MAD01 | 172.16.1.220 | 172.16.0.250 | Yes |
| 03/30/2011 17:44:17 | Ethernet | EMRA1-BU01 | EMRA1-MAD02 | 172.16.0.220 | 172.16.0.251 | Yes |
| 03/30/2011 17:44:20 | Ethernet | EMRA1-BU01 | EMRA1-MAD02 | 172.16.1.220 | 172.16.0.251 | Yes |
| 03/30/2011 17:44:23 | Ethernet | EMRA1-BU01 | EMRA1-CTL01 | 172.16.0.220 | 172.16.0.240 | Yes |
| 03/30/2011 17:44:26 | Ethernet | EMRA1-BU01 | EMRA1-CTL01 | 172.16.1.220 | 172.16.0.240 | Yes |
| 03/30/2011 17:44:29 | Ethernet | EMRA1-BU01 | EMRA1-CTL02 | 172.16.0.220 | 172.16.0.241 | Yes |
| 03/30/2011 17:44:31 | Ethernet | EMRA1-BU01 | EMRA1-CTL02 | 172.16.1.220 | 172.16.0.241 | Yes |
| ... | ... | ... | ... | ... | ... | ... |

*Figure 4C*

| VerificationResult - Notepad | | | | | |
|---|---|---|---|---|---|
| File  Edit  Format  View  Help | | | | | |
| Run Number : 0011 | | | | | |
| Mode : NonVerbose | | | | | |
| Date_Time | NodeName | TestName | Status | SubTestName | Remark |
| 03/30/2011  17:46:01 | emra1-bu01 | Active Server License | Failed | Server License Status | The license status must be:Licensed; The current statuses found are: OOBGrace |
| 03/30/2011  17:50:54 | emra1-cmp01 | Active Server License | Failed | Server License Status | The license status must be:Licensed; The current statuses found are: OOBGrace |
| 03/30/2011  17:50:59 | emra1-cmp02 | Active Server License | Failed | Server License Status | The license status must be:Licensed; The current statuses found are: OOBGrace |
| 03/30/2011  17:50:59 | emra1-cmp03 | Active Server License | Failed | Server License Status | The license status must be:Licensed; The current statuses found are: OOBGrace |
| 03/30/2011  17:50:59 | emra1-cmp04 | Active Server License | Failed | Server License Status | The license status must be:Licensed; The current statuses found are: OOBGrace |
| 03/30/2011  17:50:58 | emra1-cmp05 | Active Server License | Failed | Server License Status | The license status must be:Licensed; The current statuses found are: OOBGrace |
| 03/30/2011  17:50:59 | emra1-cmp06 | Active Server License | Failed | Server License Status | The license status must be:Licensed; The current statuses found are: OOBGrace |
| ... | ... | ... | ... | ... | ... |

*Figure 4D*

```
FirmwareVerifier - Notepad
File  Edit  Format  View  Help

||  ||  ||  ||  ||  ||  ||  ||  ||  ||  ||  ||  ||  ||  ||
        ==>Storage Management Array Disk<==
                    •
                    •
 ||  ||  ||  ||  ||  ||  ||  ||  ||  ||  ||  ||  ||  ||  ||
        ==>Storage Management Controller<==
                    •
                    •
 ||  ||  ||  ||  ||  ||  ||  ||  ||  ||  ||  ||  ||  ||  ||
                    ==>Bios Information<==
                    •
                    •
 ||  ||  ||  ||  ||  ||  ||  ||  ||  ||  ||  ||  ||  ||  ||

EMRA1-CMP01
==>Base Board<==

Caption: Base Board
Serial Number:...CN7016394300K.
Manufacturer: Dell Inc.
Version: A02
Description: Base Board
ConfigOption: NVRAM_CLR:  Clear user settable NVRAM areas and set defaults
ConfigOption: PWRD_EN:  Close to enable password
```

*Figure 4E (Continued)*

```
Administrator:Windows PowerShell
Parsing log file for : \\emra1-cmp01
Parsing log file for : \\emra1-cmp02
Parsing log file for : \\emra1-cmp03
Parsing log file for : \\emra1-cmp04
Parsing log file for : \\emra1-cmp05
Parsing log file for : \\emra1-cmp06
Parsing log file for : \\emra1-cmp07
Parsing log file for : \\emra1-cmp08
Parsing log file for : \\emra1-cmp09
Parsing log file for : \\emra1-cmp10
Parsing log file for : \\emra1-cmp11
Parsing log file for : \\emra1-cmp12
Parsing log file for : \\emra1-cmp13
Parsing log file for : \\emra1-cmp14
Parsing log file for : \\emra1-cmp15
Parsing log file for : \\emra1-cmp16
Parsing log file for : \\emra1-cmp91
Parsing log file for : \\emra1-cmp92
Parsing log file for : \\emra1-ct101
Parsing log file for : \\emra1-ct102
Parsing log file for : \\emra1-lz01
Parsing log file for : \\emra1-mad01
Parsing log file for : \\emra1-mad02

Aggregating Ping Result....
Log Files are generated on path \\EMRA1-MAD01\logs
PS C:\Program Files\Microsoft SQL Server PDW Appliance Validator\PSScripts>
```

Window 501

*Figure 5*

PDW Validator PASS-FAIL Report – Run: 0001

• Server      602      606      Back to summary

| ID | Status | CPUModel | CORE | RAM | ReadSpeed | WriteSpeed | CopySpeed |
|---|---|---|---|---|---|---|---|
| ⊗ 34MN3-CMP01 | Compute | Intel(R)Xeon® CPU X5550 @ 1.33Ghz | 8 | 96GB | 18548.2MB\sec | 31313.1MB\sec | 17533.0MB\sec |
| ⊗ 34MN3-CMP01 | Compute | Intel(R)Xeon® CPU X5550 @ 2.67Ghz | 16 | 10GB | 18548.2MB\sec | 31313.1MB\sec | 17533.0MB\sec |
| ⊗ 34MN3-CMP01 | Compute | Intel(R)Xeon® CPU X5550 @ 2.67Ghz | 16 | 96GB | 18548.2MB\sec | 3.1MB\sec | 17533.0MB\sec |
| ⊘ 34MN3-CMP01 | Compute | Intel(R)Xeon® CPU X5550 @ 2.67Ghz | 16 | 96GB | 18548.2MB\sec | 31313.1MB\sec | 17533.0MB\sec |
| ⊘ 34MN3-CMP01 | Compute | Intel(R)Xeon® CPU X5550 @ 2.67Ghz | 16 | 96GB | 18548.2MB\sec | 31313.1MB\sec | 17533.0MB\sec |
| ⊘ 34MN3-CMP01 | Compute | Intel(R)Xeon® CPU X5550 @ 2.67Ghz | 16 | 96GB | 18548.2MB\sec | 31313.1MB\sec | 17533.0MB\sec |
| ⊘ 34MN3-CMP01 | Compute | Intel(R)Xeon® CPU X5550 @ 2.67Ghz | 16 | 96GB | 18548.2MB\sec | 31313.1MB\sec | 17533.0MB\sec |
| ⊘ 34MN3-CMP01 | Compute | Intel(R)Xeon® CPU X5550 @ 2.67Ghz | 16 | 96GB | 18548.2MB\sec | 31313.1MB\sec | 17533.0MB\sec |
| ⊘ 34MN3-CMP01 | Compute | Intel(R)Xeon® CPU X5550 @ 2.67Ghz | 16 | 96GB | 18548.2MB\sec | 31313.1MB\sec | 17533.0MB\sec |

VALIDATING THE CONFIGURATION OF DISTRIBUTED SYSTEMS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, a number of nodes are deployed, such as, for example, within an organization or in a "cloud", to provide a software service or appliance. Different portions of appliance functionality can then be implemented at different nodes. Collectively, the different portions of appliance functionality represent the overall functionality of the appliance.

Validation techniques can be used to validate hardware and/or software configuration for each individual node of an appliance. Validation information for each node can be reported to a user. That is, a user can be provided with raw validation information for individual nodes.

However, there is typically no automated mechanism for aggregating and/or reasoning over validation information from a number of different nodes. Thus, there is limited, if any, mechanisms for providing an overall validation of an appliance or for providing a user with guidance related to overall appliance configuration. As such, a user is burdened with analyzing validation information from multiple to different nodes in an effort to understand the overall configuration of and identify potential problems with the appliance. As the number of nodes used to implement an appliance increases, a user's ability to understand and make decisions based on validation information from individual nodes becomes correspondingly more difficult.

BRIEF SUMMARY

The present invention extends to methods, systems, and computer program products for validating the configuration of distributed systems. An appliance definition file is read to identify the topology for a plurality of nodes an appliance. The topology defines hardware and software components that are to provide appliance functionality at each node.

A validation agent is deployed to each of the plurality of nodes. Each validation agent is configured to execute validation utilities resident at the node to validate one or more of hardware components and software components that are to provide appliance functionality at the node. Validation results are collected for the appliance by collecting validation results from each of the plurality of nodes in parallel.

For each node, a validation agent at the node is instructed to execute one or more of the validation utilities resident at the node. The one or more validation utilities validate one or more of hardware components and software components at the node based on the hardware and software components defined for the node in the identified topology. One or more logs are produced for the node. The one or more logs contain validation results for the one or more of hardware components and software components at the node. The one or more logs are generated during execution of the one or more validation utilities resident at the node.

The one or more logs from each node in the plurality of nodes are aggregated with one another to formulate aggregated logs for the appliance. A report indicative of the validity of the appliance is generated from the aggregated logs.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 4A-4E illustrates the contents of different log files.

FIG. 6 illustrates an example of a dashboard snapshot.

DETAILED DESCRIPTION

Figure 1:
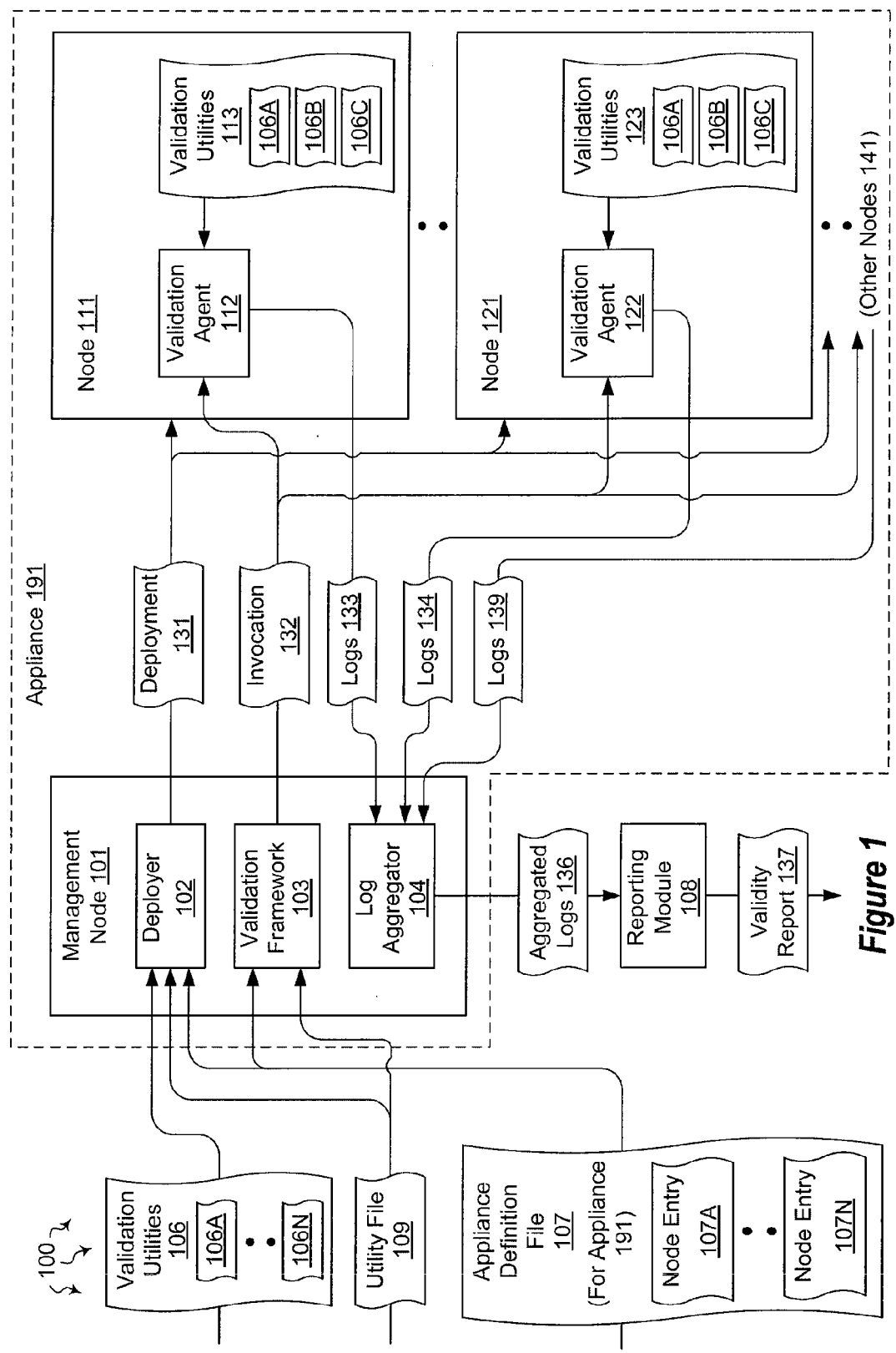
FIG. 1 illustrates an example computer architecture that facilitates validating an appliance implemented at a distributed system.

The present invention extends to methods, systems, and computer program products for validating the configuration of distributed systems. An appliance definition file is read to identify the topology for a plurality of nodes of an appliance. The topology defines hardware and software components that are to provide appliance functionality at each node.

A validation agent is deployed to each of the plurality of nodes. Each validation agent is configured to execute validation utilities resident at the node to validate one or more of hardware components and software components that are to provide appliance functionality at the node. Validation results are collected for the appliance by collecting validation results from each of the plurality of nodes in parallel.

For each node, a validation agent at the node is instructed to execute one or more of the validation utilities resident at the node. The one or more validation utilities validate one or more of hardware components and software components at the node based on the hardware and software components defined for the node in the identified topology. One or more logs are produced for the node. The one or more logs contain validation results for the one or more of hardware components and software components at the node. The one or more logs are generated during execution of the one or more validation utilities resident at the node.

The one or more logs from each node in the plurality of nodes are aggregated with one another to formulate aggregated logs for the appliance. A report indicative of the validity of the appliance is generated from the aggregated logs.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, embodiments of the invention are used to validate distributed systems. Validation information for various different nodes of an appliance can be collected and stored. The validation information for various different nodes can be aggregated to indicate the validity of the appliance as a single view/unit. Collection, storage, and presentation of validation information is customizable and can provide abstraction from distributed system complexity.

Validating a distributed system can include deploying a validation agent at each node that implements a portion of appliance functionality. Validation agent responsibility can include validating the configuration and operation of distributed system hardware components, (e.g. CPU, memory, storage, NIC, etc.), validating the configuration and operation of distributed system software components, and persisting collected validation information into (e.g., permanent) data stores. Validation agents can be fully autonomous and distributed within an appliance. A reporting agent can be configured to correlate and reason over validation information from different nodes to discover configurations that may lead to less than appropriate performance, errors, system level failures, etc., during operation of appliance 191.

FIG. 1 illustrates an example computer architecture 100 that facilitates validating an appliance implemented at a distributed system. Referring to FIG. 1, computer architecture 100 includes management node 101, node 111, node 112, other nodes 141, and reporting module 108. Each of the depicted components is connected to one another over (or is part of) a network, such as, for example, a Storage Area Network ("SAN"), Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Management node 101, node 111, node 112, and other nodes 141 can each provide a portion of the functionality of appliance 191 (e.g., a storage appliance). As such, the functionality of appliance 191 is distributed at least across management node 101, node 111, node 112, and other nodes 141. In some embodiments, appliance 191 is a storage appliance including hardware components and software components for storing data.

As depicted, management node 101 includes deployer 102, validation framework 103, and log aggregator 104. In general, deployer 102 is configured to deploy components for validating appliance 191 to the nodes of appliance 191. Deployer 102 is configured to read an appliance definition file (e.g., appliance definition file 107) and utility file (e.g., utility file 109). From the appliance definition file, deployer 102 can identify the topology for nodes of an appliance. The topology defines hardware and software components that are to provide appliance functionality at each node. In general, an appliance definition file (e.g., an eXtensible Markup Language ("XML") file) includes a plurality of node entries. Each node entry corresponds to a node type (e.g., control node, management node, landing zone node, back up node, compute node, etc.,) and defines hardware and software used to implement the node type. A validation agent can be included in the software components at each node.

From the utility file, deployer 102 can determine appropriate validation utilities to deploy to a node based on appliance topology and node type. Deployer 102 can copy appropriate validation utilities to each node.

In general, validation framework 103 is configured to invoke validation of appliance 191. Validation framework 103 can also read an appliance definition file (e.g., appliance definition file 107) and utility file (e.g., utility file 109). From the appliance definition file and utility file, validation framework can formulate instructions to send to nodes of appliance 191. The instructions can instruct a validation agent at a node to execute one or more (previously copied) validation utilities at the node.

During execution, a validation utility can validate various aspects of a hardware and/or software components at a node. The validation utility can generate a log containing the results of the validation. Logs can be sent to log aggregator 104.

In general, log aggregator 104 is configured to receive logs from one or more nodes and aggregate the logs together. Reporting module 108 can access aggregated logs and generate various reports related to the validity of the configuration of appliance 191.

Figure 2:
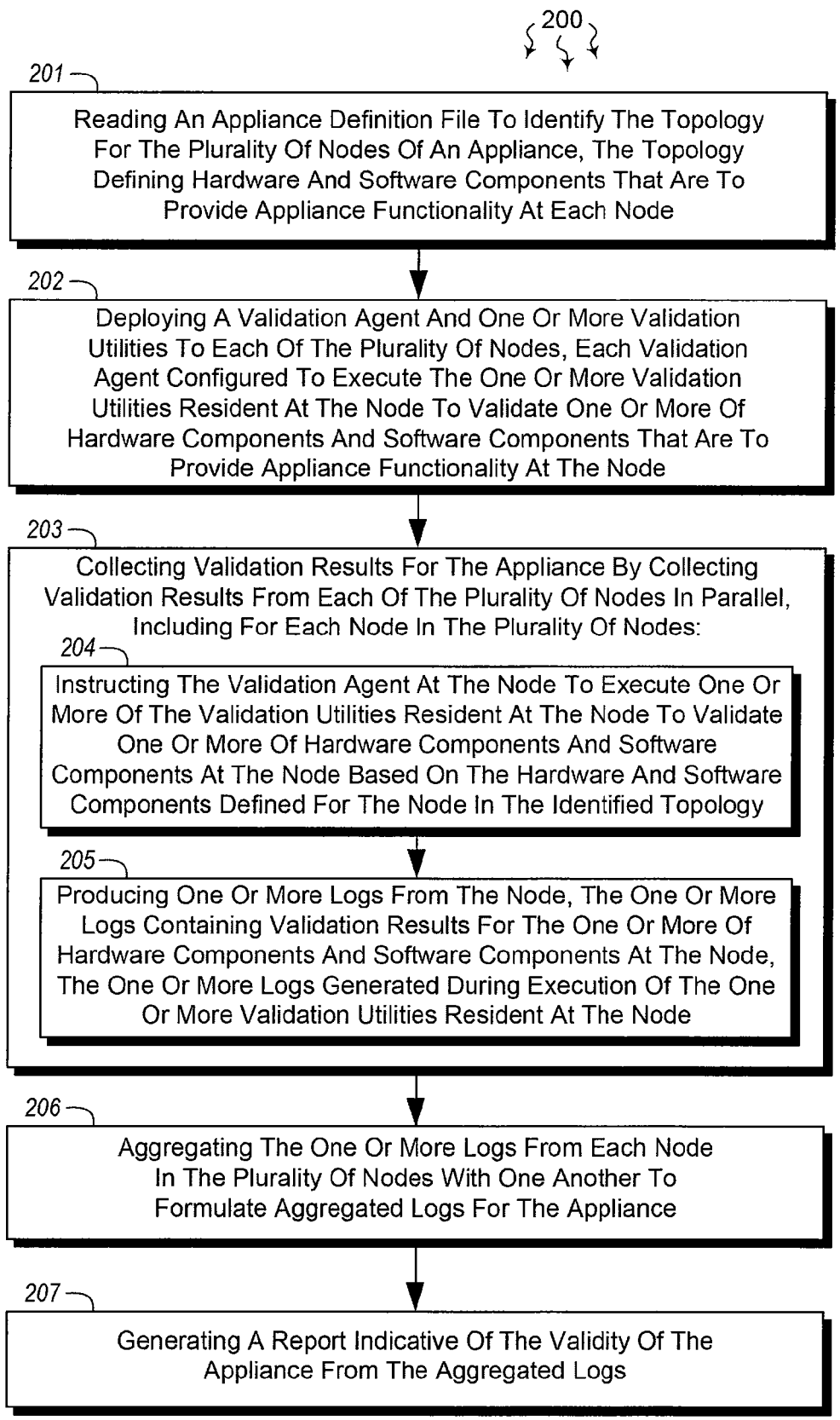
FIG. 2 illustrates a flow chart of an example method for validating an appliance implemented at a distributed system.

FIG. 2 illustrates a flow chart of an example method 200 for validating an appliance implemented at a distributed system. Method 200 will be described with respect to the components and data of computer architecture 100.

Method 200 includes an act of reading an appliance definition file to identify the topology for the plurality of nodes of an appliance, the topology defining hardware and software components that are to provide appliance functionality at each node (act 201). For example, deployer 102 can read application definition file 107. From application definition file 107, deployer 102 can identify the topology for nodes (e.g., node 111, node 121, and other nodes 141) of appliance 191. The topology for appliance 191 can define the hardware and software components that are to provide appliance functionality at node 111, at node 121, and at other nodes 141.

Within appliance definition file 107, each of node entries 107A-107N corresponds to a node type. For example, node entry 107A can define a management node type (e.g., implemented at management node 101), a node entry 107B (not shown) can define a compute node type (e.g., implemented at node 111), a node entry 107C can define a backup node type (e.g., implemented at node 112). Other node entries can define control node types, landing zone node types, etc. A node type can be implemented at a plurality of different nodes.

Accordingly, appliance functionality can include operating as specified type of node (e.g. management, control, backup, landing zone, compute, etc.) defined in application definition file 107. Deployer 102 can also read utility file 109 to determine the appropriate validation utilities to deploy at each of node 111, node 121, and other nodes 141 based on the topology of appliance 191 and node types of node 111, node 112, and other nodes 141.

Deployer 102 can issue deployment 131 to node 111, node 121, and other nodes 141. Deployment 131 can include appropriate validation utilities for each node. As such, deployer 102 can copy the appropriate validation utilities to each of node 111, node 121, and other nodes 141. For example, deployer 102 can copy validation utilities 113, including validation utilities 106A, 106B, and 106C, to node 111. Deployer 102 can also copy validation utilities 123, including validation utilities 106A, 106B, and 106C, to node 121. Deployer 102 can also copy appropriate validation utilities to other nodes 141 (which may or may not match validation utilities copied to nodes 111 and 121).

Deployed validation utilities can include utilities for validating hardware and software components of appliance 191. For example, validation utilities can validate nodes have a specified number of CPU cores, that nodes have a specified amount of RAM, that CPU cores are operational. Validation utilities can validate that a storage subsystem Storage Area Network ("SAN") and Direct Attached Storage ("DAS") perform as expected in terms of sequential I/O and random I/O speed and throughput. Validation utilities can validate that Infiniband and Ethernet networks interconnecting nodes have connectivity and bandwidth according to hardware specifications. Validation utilities can validate software components at nodes including operating system, fault tolerant software components, database systems, registry entries, security configurations, and versions.

Method 200 includes an act of deploying a validation agent to each of the plurality of nodes, each validation agent configured to execute validation utilities resident at the node to validate one or more of hardware components and software components that are to provide appliance functionality at the node (act 202). For example, management node 101 can deploy validation agents 112 and 122 at nodes 111 and 121 respectively. Management node 101 can also deploy a validation agent at each of other nodes 141. Validation agent 112 is configured to execute validation utilities resident at node 111 to validate hardware and/or software components at node 111 that provide functionality for appliance 191. Similarly, validation agent 122 is configured to execute validation utilities resident at node 121 to validate hardware and/or software components at node 112 that provide functionality for appliance 191. Validation agents at each of other nodes 141 can execute validation utilities to validate hardware and/or software components at the nodes that provide functionality for appliance 191.

Method 200 includes an act of collecting validation results for the appliance by collecting validation results from each of the plurality of nodes in parallel (act 203). For example, management node 101 can collect validation results for appliance 191 by collecting validation results from node 111, node 121, and other nodes 141.

Act 203 can include for each node in the plurality of nodes, an act of instructing the validation agent at the node to execute one or more of the validation utilities resident at the node to validate one or more of hardware components and software components at the node based on the hardware and software components defined for the node in the identified topology (act 204). For example, validation framework can send invocation 132 to node 111, node 112, and each of other nodes 141. Invocation 132 instructs validation agents 112, 122, and validation agents at other nodes 144 to validate hardware and software components at nodes 111, 121, and other nodes 144 respectively. Hardware and software components can be validated at each node based on the hardware and software components defined for the node in the identified topology of appliance 191.

Act 203 can include for each node in the plurality of nodes, an act of producing one or more logs from the node, the one or more logs containing validation results for the one or more of hardware components and software components at the node, the one or more logs generated during execution of the one or more validation utilities resident at the node (act 205). For example, validation agent 112 can produce logs 133 from node 111. Logs 133 contain validation results for hardware and software components at node 111 that were generated during execution of validation utilities 113. Similarly, validation agent 122 can produce logs 134 from node 121. Logs 134 contain validation results for hardware and software components at node 121 that were generated during execution of validation utilities 123. Validation agents at other nodes 141 can also produce logs 139. Logs 139 can contain validation results for hardware and software at other nodes 141.

Logs from each node can be sent to management node 101. For example, node 111, node 112, and other nodes 141 can send logs 133, logs 134, and logs 139 respectively to management node 101. The logs can be received at log aggregator 104. For example, log aggregator 104 can receive logs 133, logs 134, and logs 139.

Method 200 includes an act of aggregating the one or more logs from each node in the plurality of nodes with one another to formulate aggregated logs for the appliance (act 206). For example, log aggregator 104 can aggregate logs 133, logs 134, and logs 139 to formulate aggregated logs 136 for appliance 191. Log aggregator 104 can send aggregated logs 136 to reporting module 108. Reporting module 108 can receive aggregated logs 136 from log aggregator 104.

Method 200 includes an act of generating a report indicative of the validity of the appliance from the aggregated logs (act 207). For example, reporting module 108 can generate validity report 137 for application 191 from aggregated logs 136. Reporting module can reason over aggregated logs 136 to formulate validity report 137. Report 137 can abstract the physical implementation of application. Reasoning over aggregated logs 136 can include correlating validation results from logs 133, logs 134, and logs 139 into a condition of interest with respect to the configuration of appliance 191.

Accordingly, in some embodiments, distributed validation includes a set of validations agents installed/deployed on every node within an appliance. Each validation agent functions completely independent of each other and have their own set of appliance components that they validate resulting in increased parallelism.

Figure 3:
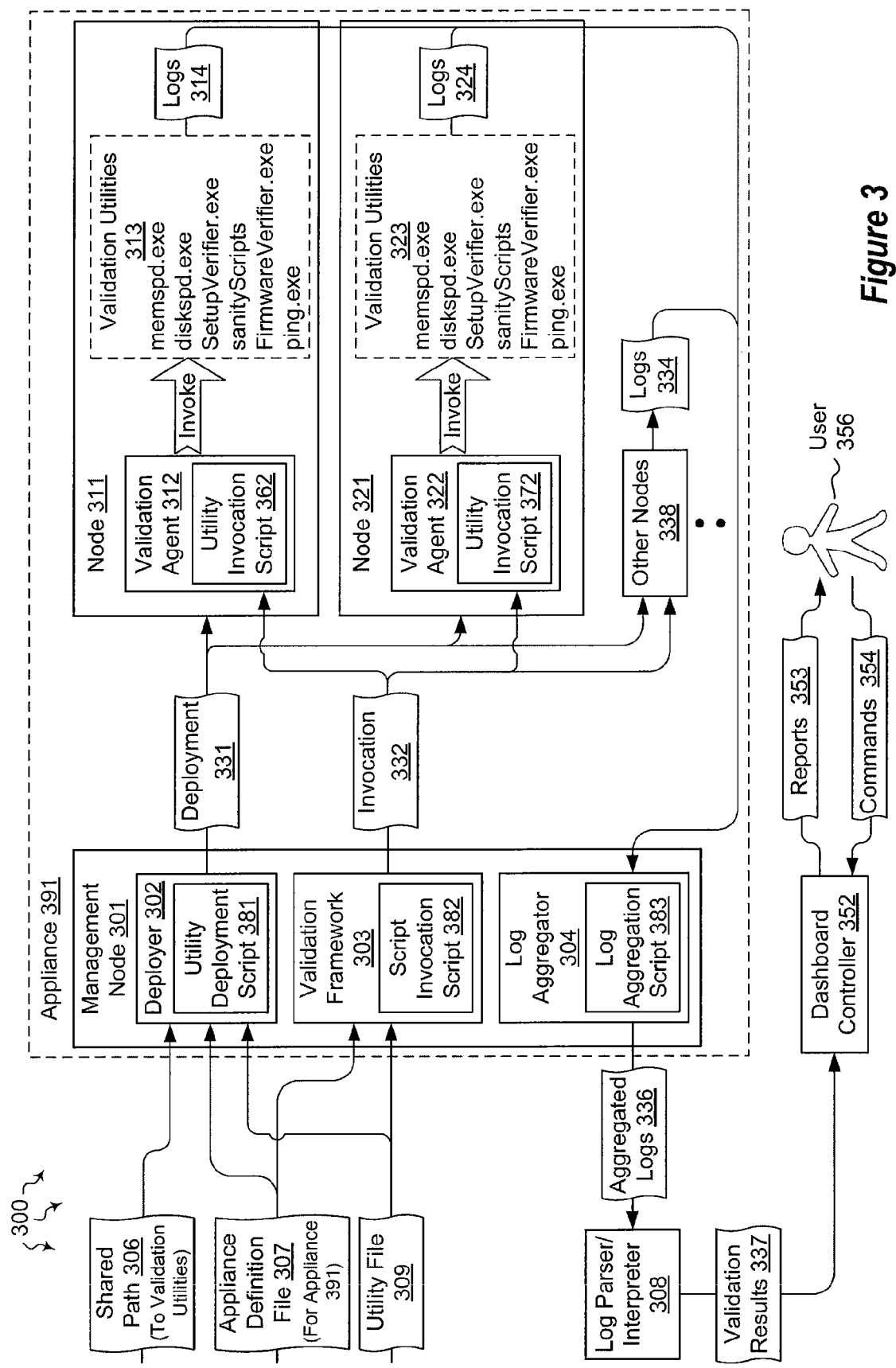
FIG. 3 illustrates another example computer architecture that facilitates monitoring an appliance implemented at a distributed system.

FIG. 3 illustrates an example, computer architecture 300 that facilitates monitoring an appliance implemented at a distributed system. Referring to FIG. 3, computer architecture 300 includes management node 301, node 311, node 312, other nodes 341, log parser/interpreter 308, and dashboard controller 352. Each of the depicted components is connected to one another over (or is part of) a network, such as, for example, a Storage Area Network ("SAN"), Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Management node 301, node 311, node 312, and other nodes 341 can each provide a portion of the functionality of appliance 391 (e.g., a storage appliance). As such, the functionality of appliance 391 is distributed at least across management node 301, node 311, node 312, and other nodes 341. In some embodiments, appliance 391 is a storage appliance including hardware components and software components for storing data.

As depicted, management node 301 includes deployer 302, validation framework 303, and log aggregator 304. In general, deployer 302 is configured to deploy components for validating appliance 391 to the nodes of appliance 391. Utility deployment script 381 can read an appliance definition file 307 and utility file 309. From appliance definition file 307, deployer 302 can identify the topology for nodes 311, 321, and other nodes 338 of appliance 391. The topology defines hardware and software components that are to provide appliance functionality at each of nodes 311, 321, and other nodes 338. Appliance definition file 307 includes a plurality of node entries. Each node entry corresponds to a node type (e.g., control node, management node, landing zone node, back up node, compute node, etc.,) and defines hardware and software used to implement the node type. A validation agent can be included in the software components at each node.

From the utility file 309, utility deployment script 381 can determine appropriate validation utilities to deploy to each of nodes 311 and 312 and each of other nodes 338 based on the topology of appliance 391 and node type. Utility deployment script 381 can refer to shared path 306 to access appropriate validation utilities for each of nodes 311 and 321 and each of other nodes 338. Utility deployment script 381 can issue deployment 331. Deployment 331 can include appropriate validation utilities for each node. As such, deployer 302 can copy the appropriate validation utilities to each of node 311 and node 321 and each of other nodes 338. For example, utility deployment script 381 can copy validation utilities 313 to node 311 and can copy validation utilities 323 to node 321. Utility deployment script 381 can also copy appropriate validation utilities to each of other nodes 338.

Validation utilities can include a memory validator (e.g., memspeed.exe), which validates all computers to ensure they contain the correct number of CPU cores, the right amount of RAM, and that the RAM speed is within expected tolerances in GB/s. Validation utilities can include a disk validator (e.g., diskspeed.exe), which checks the DAS and SAN disk storage components to ensure all LUNs are reachable and that they deliver the expected sequential and random I/O throughput. Validation utilities can include connectivity validator (e.g., ping.exe), which checks that all nodes in the appliance can communicate with each other via (e.g., Infiniband and/or Ethernet) networks installed on the appliance. The connectivity validator can also validate that the network interface cards (NICs) are configured properly.

Validation utilities can include a software validator (e.g., setupverifier.exe), which ensures all Parallel Data Warehouse ("PDW") software components, such as, for example, a PDW engine, a PDW Data Movement Service, SQL Server, Windows, Data Access Drivers, registry settings, Windows configuration and security settings have the correct versions and are set properly. Validation utilities can include a basic functionality validator (e.g., sanity scripts), which is a form of sanity test on the appliance. A basic functionality validator can ensure that specified basic operations on the PDW, such as, for example, creation of a database, creation of distributed tables, execution of queries, are operational. Validation utilities can include firmware validators which validate firmware versions of control cards in the system, such as, for example, storage controllers, CPU, and Infiniband and Ethernet network switches. All of these utilities can generate logs.

Management node 301 can deploy validation agents 112 and 122 at nodes 111 and 121 respectively. Management node 301 can also deploy a validation agent at each of other nodes 338. Validation agent 312 is configured to execute validation utilities 313 to validate hardware and/or software components at node 311 that provide functionality for appliance 391. Similarly, validation agent 322 is configured validation utilities 323 to validate hardware and/or software components at node 321 that provide functionality for appliance 391. Validation agents at each of other nodes 338 can be configured to execute validation utilities to validate hardware and/or software components at those nodes that provide functionality for appliance 391.

Management node 301 can collect validation results for appliance 191 by collecting validation results from node 111, node 121, and other nodes 141. Validation framework 303 can execute script invocation script to (remotely) send invocation 332 to node 311, node 312, and each of other nodes 338. Invocation 332 instructs validation agents 312, 322, and validation agents at other nodes 338 to executed resident validation utilities validate hardware and software components at nodes 311, 321, and other nodes 338 respectively. Hardware and software components can be validated based on the identified topology of appliance 391.

Upon receiving invocation 332, utility invocation script 362 can invoke validation utilities 313. Similarly, upon receiving invocation 332, utility invocation script 372 can invoke validation utilities 323. Upon receiving invocation 332, utility invocation scripts at each of other nodes 338 can also invoke appropriate validation utilities.

During execution, validation utilities 313 can attempt to validate hardware and/or software components at node 311. Validation utilities 313 can generate logs 314 indicating results of attempting to validate hardware and/or software components of node 311. Similarly, validation utilities 323 can attempt to validate hardware and/or software components at node 321. Validation utilities 323 can generate logs 324 indicating results of attempting to validate hardware and/or software components of node 321. Validation utilities at each of other nodes 338 can attempt to validate hardware and/or software components at each of other nodes 338. The validation utilities can generate logs 334 indicating results of attempting to validate hardware and/or software components at each of other nodes 338.

Logs 314, 324, and 334 can be sent to log aggregator 104. Log aggregator 334 can receive logs 314, 324, and 334. Log aggregation script 383 can aggregate logs 314, 324, and 334 to formulate aggregated logs 336. Log aggregator 304 can send aggregated logs 336 to log parser/interpreter 308.

Figure 4B:
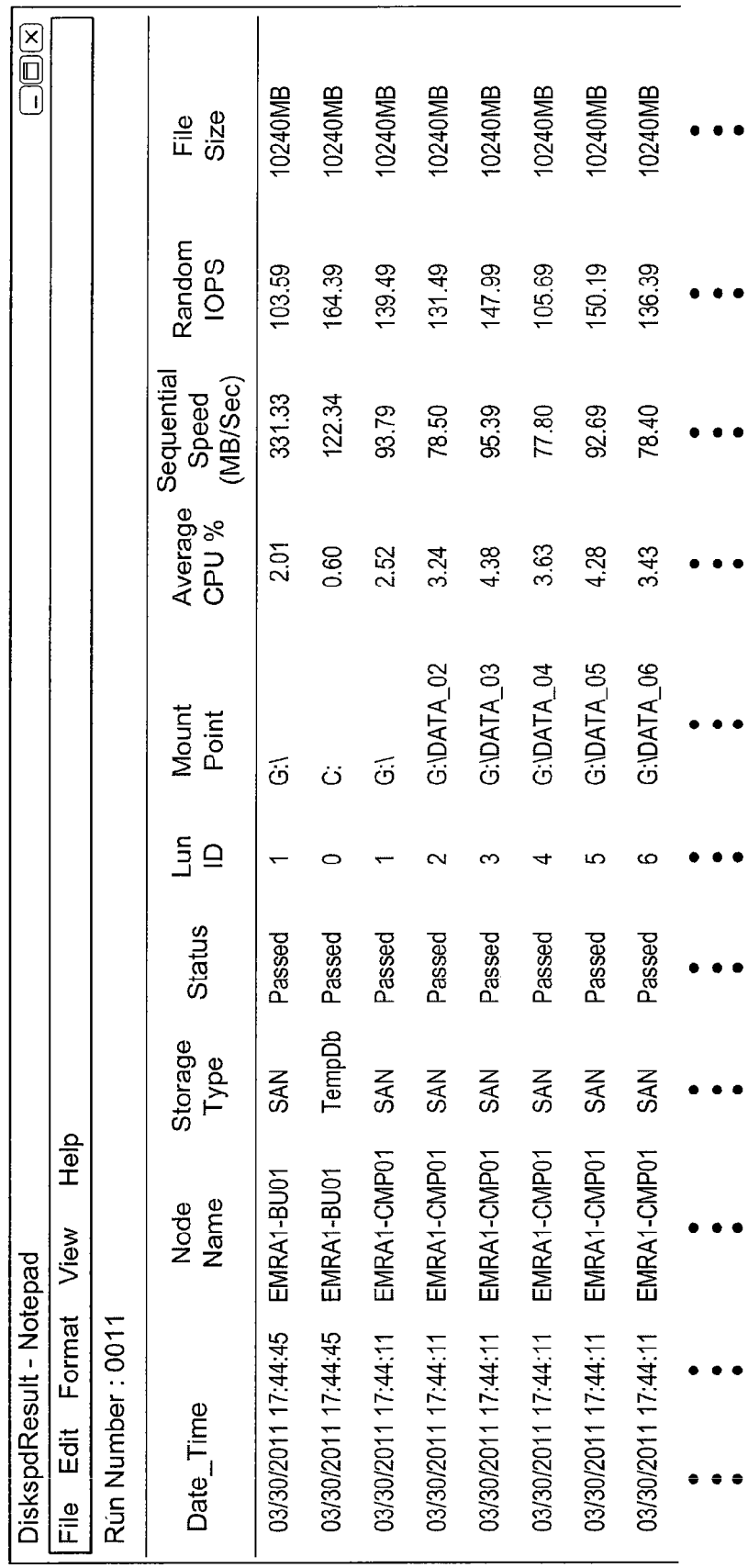
Figure 4E:
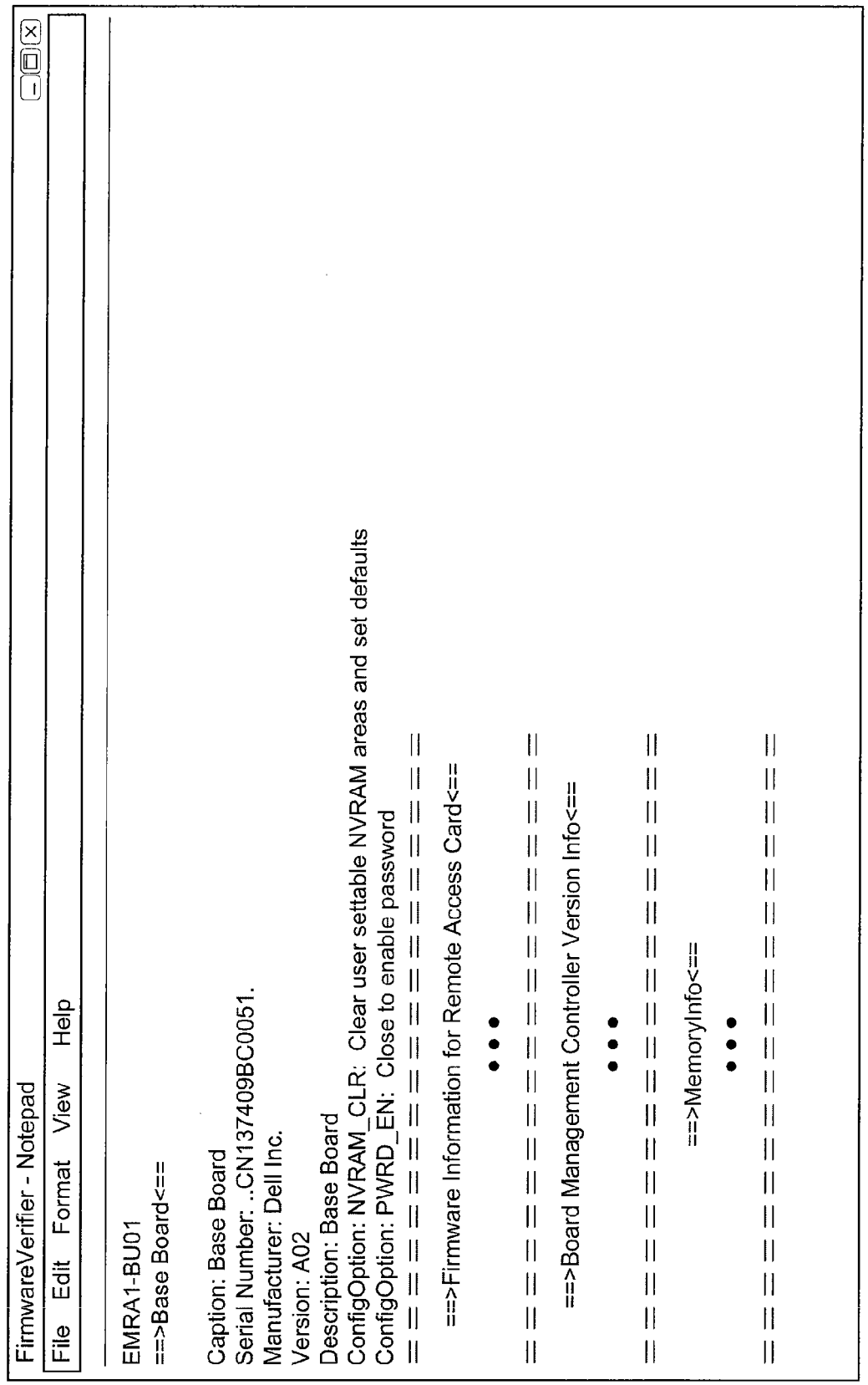
Figure 4E:
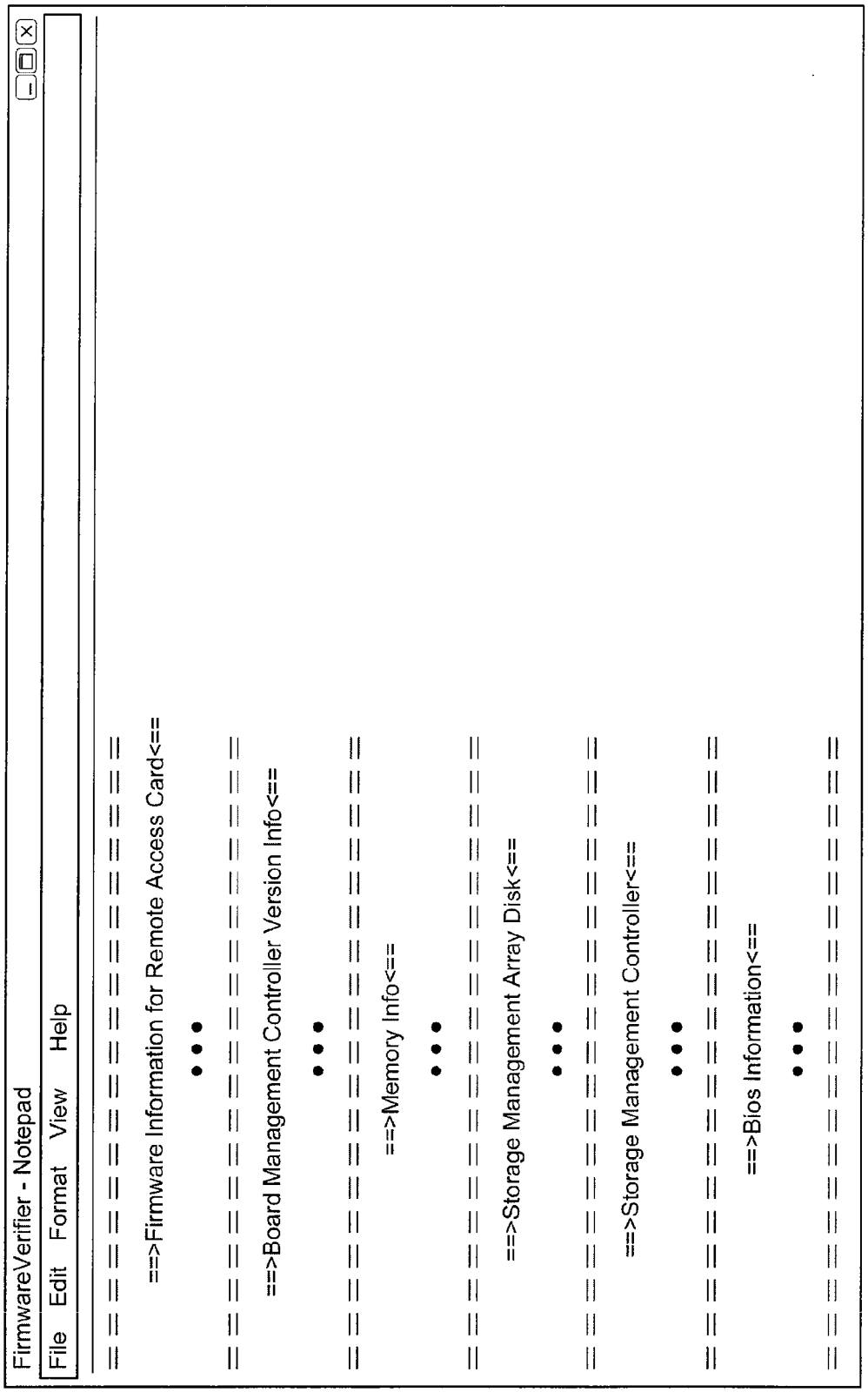

Logs for different utilities can contain different types of data. FIGS. 4A-4E illustrates the contents of different log files. More specifically, FIG. 4A depicts a portion of a log file generated by a memsped.exe utility. FIG. 4B depicts a portion of a log file generated by a diskspd.exe utility. FIG. 4C depicts a portion of a log file generated by a ping.exe utility. FIG. 4D depicts a portion of a log file generated by a setupverifier.exe utility. FIG. 4E depicts a portion of a log file generated by a firmwareverifier.exe.

Figure 5:
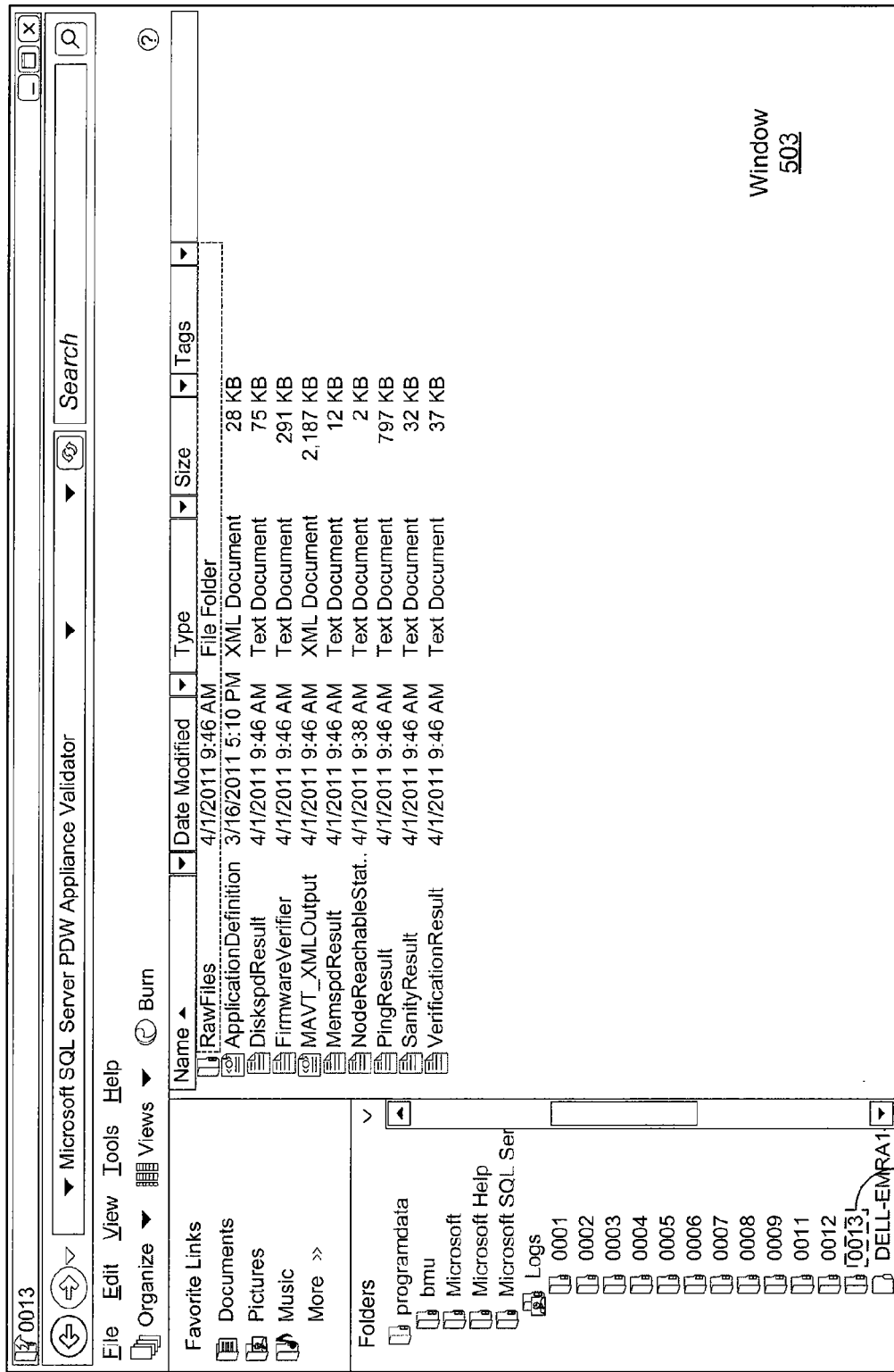
FIG. 5 illustrates the aggregation of ping logs and a final list of logs after aggregation is completed.

Log parser/interpreter 308 can parse aggregated logs 336 in view of various parameters for different types of hardware to generate validation results 337. In some embodiments, thresholds are represents using statistically mechanisms, such as, for example, standard deviation, Z score method, modified Z score method, BoxPlot method, adjust BoxPlot method, MADe method, median rule, etc. Using these statistical mechanisms values between comparable nodes are considered in one set. An appropriate outlier method is then applied and outliers are identified. FIG. 5 illustrates the aggregation of ping logs and a final list of logs after aggregation is completed. More specifically, window 501 depicts ping logs from various difference machines being aggregated. Window 503 depicts a list of log files in folder 502 after a set of aggregations are completed.

Log parser/interpreter 308 sends validation results 337 to dashboard controller 352. Dashboard controller 352 receives validation results 337 from log parser/interpreter 308. Dashboard control can generate reports 353 from validation results 337. Report 353 can indicate by node what validation utilities encountered hardware and/or software configurations indicating potential problems (e.g., were outliers) at the node. Reports 353 can be divided into categories, such as, for example, serer, storage, software, etc. Reports 353 can be any of a variety of different formats, such as, for example, charts, tabular, drill-downs, etc. User 356 can submit commands to dashboard controller 352 to alter how reports 353 are presented.

Reports 353 can include a dashboard snapshot. FIG. 6 illustrates an example dashboard snapshot 601. Values 602, 603, 604, and 606 indicate potential outlier values identified through statistical mechanisms.

Accordingly, validation can include a collection of utilities that are systematically deployed across the nodes of an appliance. The utilities execute specified tasks, that when completed, validate the proper functioning state of hardware and/or software components of that appliance. The utilities generate logs, which can be aggregated to present a global view of the appliance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors, system memory, and persistent storage, the computer system being one of a plurality of computer systems in a distributed system, a plurality of nodes distributed across the plurality of computer systems and connected via a network, the plurality of nodes collectively configured to provide functionality for an appliance, a method for validating the correct hardware and software configuration of the appliance, the method comprising:
- an act of reading an appliance definition file to identify the topology for the plurality of nodes of the appliance, the topology defining hardware and software components that are to provide appliance functionality at each node;
- an act of determining which of a plurality of validation utilities should be deployed to each of the plurality of nodes, based at least in part on the topology of the plurality of nodes;
- an act of deploying a validation agent to each of the plurality of nodes, each validation agent configured to execute validation utilities resident at the node to validate one or more of hardware components and software components that are to provide appliance functionality at the node, wherein said deploying also includes deploying different validation utilities to at least some of the different nodes such that at least two nodes have different or non-matching validation utilities;
- an act of collecting validation results for the appliance by collecting validation results from each of the plurality of nodes in parallel, including for each node in the plurality of nodes:
  - an act of instructing the validation agent at the node to execute one or more of the validation utilities resident at the node to validate one or more of hardware components and software components at the node based on the hardware and software components defined for the node in the identified topology; and
  - an act of producing one or more logs from the node, the one or more logs containing validation results for the one or more of hardware components and software components at the node, the one or more logs generated during execution of the one or more validation utilities resident at the node;
- an act of aggregating the one or more logs from each node in the plurality of nodes with one another to formulate aggregated logs for the appliance; and
- an act of generating a report indicative of the validity of the appliance from the aggregated logs.

2. The method as recited in claim 1, wherein the act of reading an appliance definition file comprises an act of reading an eXtensible Markup Language ("XML") file that defines a plurality of different nodes types to be included in the appliance.

3. The method as recited in claim 1, wherein the act of instructing the validation agent to execute one or more of the validation utilities comprises instructing the validation agent to execute one or more of: a utility that validates RAM at the node, a utility that validates disk storage characteristics at the node, a utility that validates communication among nodes in the distributed system, a utility that validates software settings at the node, and a utility that validates that specified operations function as intended.

4. The method as recited in claim 1, wherein the act of generating a report indicative of the validity of the appliance from the aggregated logs comprises an act of generating a report that indicates, for each of the plurality nodes, whether or not hardware components at the node are operating appropriately and whether or not software components at the node are operating appropriately.

5. The method as recited in claim 4, wherein the act of generating a report that indicates, for each of the plurality nodes, whether or not hardware components at the node are operating appropriately and whether or not software components at the node are operating appropriately comprises an act of determining whether at least one component is operating appropriately through comparison to operational device-specific thresholds.

6. The method as recited in claim 5, further comprising prior to generating the report, an act of using statistical methods to formulate the corresponding operational device-specific threshold for the at least one component based on aggregated validation results for the at least one component.

7. The method as recited in claim 6, further comprising an act of detecting that the at least one component at a specified node is an outlier by determining that the validation results for the at least one component at the specified node do not satisfy the corresponding operational threshold for the at least one component; and
- wherein the act of generating a report that indicates if one or more one or more components at each node satisfy a corresponding threshold comprises an act of generating a report that indicates that the at least one component at the specified node is not operating appropriately.

8. The method as recited in claim 1, wherein the act generating a report indicative of the validity of the appliance from the aggregated logs comprises an act of generating a report that indicates, for each of the plurality nodes, whether each of a plurality of different categories of components is operating appropriately, the plurality of different categories including disk storage, network connectivity, and software and registry settings on the plurality of nodes in the appliance.

9. The method as recited in claim 1, wherein the act of deploying a validation agent to each of the plurality of nodes comprises an act of deploying a validation agent to each of the plurality of nodes based on the identified topology.

10. A computer program product for use at a computer system, the computer system being one of a plurality of computer systems in a distributed system, a plurality of nodes distributed across the plurality of computer systems and connected via a network, the plurality of nodes collectively configured to provide functionality for an appliance, the computer program product for implementing a method for validating the correct hardware and software configuration of the appliance, the computer program product comprising one or more computer storage devices having stored thereon computer-executable instructions that, when executed at a processor, cause the computer system to perform the method, including the following:
- read an appliance definition file to identify the topology for the plurality of nodes of the appliance, the topology defining hardware and software components that are to provide appliance functionality at each node;
- determine which of a plurality of validation utilities should be deployed to each of the plurality of nodes, based at least in part on the topology of the plurality of nodes;
- deploy a validation agent to each of the plurality of nodes, each validation agent configured to execute validation utilities resident at the node to validate one or more of hardware components and software components that are to provide appliance functionality at the node, wherein said deploying also includes deploying different validation utilities to at least some of the different nodes such that at least two nodes have different or non-matching validation utilities;
- collect validation results for the appliance by collecting validation results from each of the plurality of nodes in parallel, including for each node in the plurality of nodes:
  - instructing the validation agent at the node to execute one or more of the validation utilities resident at the node to validate one or more of hardware components and software components at the node based on the hardware and software components defined for the node in the identified topology; and producing one or more logs from the node, the one or more logs containing validation results for the one or more of hardware components and software components at the node, the one or more logs generated during execution of the one or more validation utilities resident at the node;

aggregate the one or more logs from each node in the plurality of nodes with one another to formulate aggregated logs for the appliance; and generate a report indicative of the validity of the appliance from the aggregated logs.

11. The computer program product as recited in claim 10, wherein computer-executable instructions that, when executed, cause the computer system to instruct the validation agent to execute one or more of the validation utilities comprise computer-executable instructions that, when executed, cause the computer system to instruct the validation agent to execute one or more of: a utility that validates RAM at the node, a utility that validates disk storage characteristics at the node, a utility that validates communication among nodes in the distributed system, a utility that validates software settings at the node, and a utility that validates that specified operations function as intended.

12. The computer program product as recited in claim 10, wherein computer-executable instructions that, when executed, cause the computer system to generate a report indicative of the validity of the appliance from the aggregated logs comprise computer-executable instructions that, when executed, cause the computer system to generate a report that indicates, for each of the plurality nodes, whether or not hardware components at the node are operating appropriately and whether or not software components at the node are operating appropriately.

13. The computer program product as recited in claim 12, wherein computer-executable instructions that, when executed, cause the computer system to generate a report that indicates, for each of the plurality of nodes, whether or not hardware components at the node are operating appropriately and whether or not software components at the node are operating appropriately comprise computer-executable instructions that, when executed, cause the computer system to determine whether at least one component is operating appropriately through comparison to operational device-specific thresholds.

14. The computer program product as recited in claim 13, further comprising computer-executable instructions that, when executed, cause the computer system to prior to generating the report use statistical methods to formulate the corresponding operational device-specific threshold for the at least one component based on aggregated validation results for the at least one component.

15. The computer program product as recited in claim 14, further comprising computer-executable instructions that, when executed, cause the computer system to detect that the at least one component at a specified node is an outlier by determining that the validation results for the at least one component at the specified node do not satisfy the corresponding operational threshold for the at least one component; and wherein computer-executable instructions that, when executed, cause the computer system to generate a report that indicates if one or more one or more components at each node satisfy a corresponding threshold comprise computer-executable instructions that, when executed, cause the computer system to generate a report that indicates that the at least one component at the specified node is not operating appropriately.

16. The computer program product as recited in claim 10, wherein computer-executable instructions that, when executed, cause the computer system to generate a report indicative of the validity of the appliance from the aggregated logs comprise computer-executable instructions that, when executed, cause the computer system to generate a report that indicates, for each of the plurality nodes, whether each of a plurality of different categories of components is operating appropriately, the plurality of different categories including disk storage, network connectivity, and software and registry settings on the plurality of nodes in the appliance.

17. The computer program product as recited in claim 10, wherein computer-executable instructions that, when executed, cause the computer system to deploy a validation agent to each of the plurality of nodes comprise computer-executable instructions that, when executed, cause the computer system to deploy a validation agent to each of the plurality of nodes based on the identified topology.

18. A computer system, the computer system including a storage appliance, a log parser, and a dashboard controller, the storage appliance including a management node and a plurality of nodes, the management node and each of the plurality of nodes providing a portion of functionality for the storage appliance in accordance with an appliance definition file, the appliance definition file defining a plurality of different node types, each node type having defined hardware and software components that are used to provide the functionality of the node type, wherein the management node comprises:

one or more processor;

system memory; and one or more computer storage media having stored thereon computer executable instructions representing a deployer, a validation framework, and a log aggregator, wherein the deployer is configured to:

read the appliance definition file;

identify the node topology of the appliance from the appliance definition file;

read a utility file, the utility file specifying utilities that are applicable to each of the plurality of different node types;

identify validation utilities that are to be copied to the plurality of nodes based on the contents of the utility file and the node topology of the appliance, the identified validation utilities for validation hardware and software components;

determine which of a plurality of validation utilities should be deployed to each of the plurality of nodes, based at least in part on the topology of the plurality of nodes; and copy the identified validation utilities to the plurality of nodes wherein said deploying also includes deploying different validation utilities to at least some of the different nodes such that at least two nodes have different or non-matching validation utilities;

where in the validation framework is configured to:

invoke validation agents at each of the plurality of nodes to instruct the validation agents to execute identified validation utilities copied to each of the plurality of nodes; and where in the log aggregator is configured to:

receive logs from validation utilities executed at each of the plurality of nodes, the logs including validation results from the executed validation utilities, the validation results indicating if hardware and software components at each of the plurality of nodes are operation as intended;
aggregate the logs into aggregated logs; and
send the aggregated logs to the log parser;
wherein the log parser is configured to:
receiving the aggregated logs from the log aggregator;
compare the aggregated logs to statistically generated thresholds;
generate validation results from the comparisons; and
send the validation results to the dashboard controller; and
wherein the dashboard controller is configured to:
receive validation results from the log parser;
generate reports indicating the validity of the storage appliance from the validation results; and
receive user commands altering the format the generated reports.

19. The computer system of claim 18, wherein identified utilities include one or more of: a utility that validates RAM at a node, a utility that validates disk storage characteristics at a node, a utility that validates communication among nodes in the distributed system, a utility that validates software settings at a node, and a utility that validates that specified operations function as intended.

20. The computer system of claim 18, wherein the dashboard controller being configured to generate reports from the validation results comprises the dashboard controller being configured to generating reports that indicate, for each of the plurality nodes, whether each of a plurality of different categories of components is operating appropriately, the plurality of different categories including disk storage, network connectivity, and software and registry settings on the plurality of nodes.

* * * * *